US011609179B2

(12) United States Patent
Unitt et al.

(10) Patent No.: US 11,609,179 B2
(45) Date of Patent: Mar. 21, 2023

(54) APPARATUS AND METHOD FOR MONITORING PARTICLE FLOW IN A STACK (71) Applicant: ENVEA UK Ltd, Cambridge (GB)

(72) Inventors: David Christopher Unitt, Swaffham Prior (GB); Trevor Allan Lye, Cambridgeshire (GB); Bruce Greetham, Cambridgeshire (GB)

(73) Assignee: ENVEA UK Ltd, Cambridge (GB)

( * ) Notice: Subject to any disclaimer, the term of this patent is extended or adjusted under 35 U.S.C. 154(b) by 1086 days.

(21) Appl. No.: 16/322,370

(22) PCT Filed: Jul. 28, 2017

(86) PCT No.: PCT/GB2017/052206
§ 371 (c)(1),
(2) Date: Jan. 31, 2019

(87) PCT Pub. No.: WO2018/025015
PCT Pub. Date: Feb. 8, 2018

(65) Prior Publication Data
US 2019/0195768 A1 Jun. 27, 2019

(30) Foreign Application Priority Data
Aug. 2, 2016 (GB) ..................... 1613327

(51) Int. Cl.
G01N 15/10 (2006.01)
G01N 21/15 (2006.01)
(Continued)

(52) U.S. Cl.
CPC ............ *G01N 21/15* (2013.01); *G01F 1/74* (2013.01); *G01N 15/0205* (2013.01);
(Continued)

(58) Field of Classification Search
CPC .... G01N 15/0205; G01N 15/06; G01N 15/10; G01N 15/0211; G01N 21/15;
(Continued)

(56) References Cited

U.S. PATENT DOCUMENTS 4,640,621 A 2/1987 Rose
4,973,909 A * 11/1990 Castle ................ G01N 15/0656
96/26

(Continued)

FOREIGN PATENT DOCUMENTS

CH 567721 A5 10/1975
CN 201673105 U * 12/2010
(Continued)

OTHER PUBLICATIONS

UK Intellectual Property Office, "Search Report from GB Application No. 1613327.4 dated Jan. 25, 2017", p. 1, Published: GB.
(Continued)

Primary Examiner — Hoa Q Pham
(74) Attorney, Agent, or Firm — Fogg & Powers LLC (57) ABSTRACT A method and apparatus (1) for monitoring particles flowing in a stack are disclosed. The method comprises emitting light from a light source along an optical path for scattering from the particles, rotating a rotatable monitoring assembly (15) mounted in the optical path, and detecting the scattered light using a detector. The rotatable monitoring assembly (15) contains at least two in apertures, and the method further comprises rotating the rotatable monitoring assembly (15) into a plurality of different configurations. In an operation configuration, light passes through the rotatable monitoring assembly (15) and into the stack unimpeded. In a zero-check configuration, the rotatable monitoring assembly (15) blocks the light from reaching the stack. In a span-check configuration, light of varying intensity passes from
(Continued)

the light source through the rotatable monitoring assembly (15) into the stack. In a contamination-check configuration, the light is reflected through the rotatable monitoring assembly (15) onto the detector, without entering the stack. In the safety-shutter configuration, the rotatable monitoring assembly (15) protects optical components in the instrument from particles in the stack.

15 Claims, 7 Drawing Sheets

(51) Int. Cl.
　　*G08B 17/107*　　(2006.01)
　　*G01N 21/53*　　(2006.01)
　　*G01N 15/02*　　(2006.01)
　　*G01F 1/74*　　(2006.01)
　　*G01N 15/00*　　(2006.01)

(52) U.S. Cl.
　　CPC ............. *G01N 15/10* (2013.01); *G01N 21/53* (2013.01); *G08B 17/107* (2013.01); *G01N 2015/0096* (2013.01); *G01N 2015/1075* (2013.01); *G01N 2021/536* (2013.01); *G01N 2201/024* (2013.01); *G01N 2201/1047* (2013.01); *G01N 2201/12707* (2013.01)

(58) Field of Classification Search
　　CPC .... G01N 21/53; G01N 21/534; G01N 21/532; G01N 2015/0096; G01N 2015/0046; G01N 2015/0693; G01N 2021/536; G01N 2021/4704; G08B 17/107; G08B 17/12; G01F 1/74
　　USPC ............................................ 356/335–343, 73
　　See application file for complete search history.

(56) References Cited

U.S. PATENT DOCUMENTS

| | | | |
|---|---|---|---|
| 5,028,790 A | 7/1991 | McGowan et al. | |
| 5,561,290 A | 10/1996 | Strobel et al. | |
| 8,134,706 B2 * | 3/2012 | Rogers .............. | G01N 15/0205 356/342 |
| 9,261,447 B2 | 2/2016 | Millington et al. | |
| 2005/0068527 A1 | 3/2005 | Nuspliger | |

FOREIGN PATENT DOCUMENTS

| | | |
|---|---|---|
| DE | 4313126 A1 | 10/1994 |
| EP | 1729108 A1 | 12/2006 |
| GB | 1173937 A | 12/1969 |
| GB | 2422897 A | 8/2006 |
| WO | 2004008117 A2 | 1/2004 |

OTHER PUBLICATIONS

International Searching Authority, "International Search Report and Written Opinion from PCT Application No. PCT/GB2017/052206 dated Nov. 6, 2017", from Foreign Counterpart to GB Application No. 1613327.4, dated Nov. 6, 2017, pp. 1-20, Published: WO.

International Searching Authority, "International Search Report and Written Opinion from PCT Application No. PCT/GB2017/052206 dated Nov. 6, 2017", from Foreign Counterpart to GB Application No. 1613327.4, dated Nov. 6, 2017, pp. 1-12, Published: WO.

European Patent Office, "Communication pursuant to Article 94(3) from U.S. Appl. No. 16/322,370, filed Sep. 8, 2022", from Foreign Counterpart to U.S. Appl. No. 16/322,370, filed Sep. 8, 2022, pp. 1 through 14, Published: EP.

* cited by examiner

APPARATUS AND METHOD FOR MONITORING PARTICLE FLOW IN A STACK

CROSS-REFERENCE TO RELATED APPLICATIONS

This application is a U.S. National Stage 371 Application of International Patent Application No. PCT/GB2017/052206 titled "APPARATUS AND METHOD FOR MONITORING PARTICLE FLOW IN A STACK" filed on Jul. 28, 2017, which claims priority to, and the benefit of, Great Britain Application No. 1613327.4 titled "APPARATUS AND METHOD FOR MONITORING PARTICLE FLOW IN A STACK" filed on Aug. 2, 2016 each of which are incorporated by reference herein in their entirety.

FIELD OF THE INVENTION

This invention relates to the field of measurement of particle flow in a stack. In particular, it relates to apparatus and a method for monitoring particle flow in a stack by measuring light scattered from the particles.

BACKGROUND OF THE INVENTION

Stacks, for example, industrial chimney stacks, are a potential source of pollution and consequently there are in many countries strict regulations regarding the control and measurement of pollutants emitted from the stacks. For example, there are restrictions on the rate at which particles, for example dust, are emitted from a stack. The present invention seeks to provide an improved or alternative apparatus and/or method for monitoring particles flowing in a stack.

SUMMARY OF THE INVENTION

The present invention provides, according to a first aspect, a method of monitoring particles flowing in a stack, the method comprising:
  emitting light from a light source along an optical path for scattering from the particles;
  rotating a rotatable monitoring assembly mounted in the optical path; and
  detecting the scattered light using a detector;
  wherein the rotatable monitoring assembly contains at least two apertures and the method further comprises rotating the rotatable monitoring assembly into a plurality of different configurations, including:
  an operation configuration, wherein the light passes through the rotatable monitoring assembly and into the stack unimpeded;
  a zero-check configuration, wherein the rotatable monitoring assembly blocks the light from reaching the stack;
  a span-check configuration, wherein light of varying intensity passes from the light source through the rotatable monitoring assembly into the stack;
  a contamination-check configuration, wherein the light is reflected through the rotatable monitoring assembly onto the detector, without entering the stack; and
  a safety-shutter configuration, wherein the rotatable monitoring assembly protects optical components in the instrument from particles in the stack.

According to a second aspect, the invention provides a method of monitoring particles flowing in a stack, the method comprising:
  passing incident light along an optical axis to a rotatable monitoring assembly mounted in the optical path;
  scattering light from particles in the stack; and
  detecting scattered light from particles in the stack;
  wherein the rotatable monitoring assembly contains at least two apertures, and can be rotated about the optical axis to a plurality of different configurations in order to change the path of incident light and scattered light.

According to a third aspect, the invention provides apparatus for monitoring particles flowing in a stack, the apparatus comprising:
  a light source for emitting light, along an optical path for scattering from the particles;
  a rotatable monitoring assembly mounted in the optical path;
  a detector for detecting the scattered light;
  wherein the rotatable monitoring assembly contains at least two apertures and is configurable into a plurality of different configurations, including:
  an operation configuration, wherein the light passes through the rotatable monitoring assembly and into the stack unimpeded;
  a zero-check configuration, wherein the rotatable monitoring assembly blocks the light from reaching the stack;
  a span-check configuration, wherein light of varying intensity passes from the light source through the rotatable monitoring assembly into the stack;
  a contamination-check configuration, wherein the light is reflected through the rotatable monitoring assembly onto the detector, without entering the stack; and
  a safety-shutter configuration, wherein the rotatable monitoring assembly protects optical elements in the instrument from the particles in the stack.

When the rotatable monitoring assembly is rotated into the operation configuration, light from the light source may pass along the optical path through a first aperture in the rotatable monitoring assembly and into the stack. The light may then be scattered from particles in the stack, and the scattered light may then pass through a second aperture in the rotatable monitoring assembly to the detector. The scattered light is then detected. The rotatable monitoring assembly is positioned along the optical axis of the light source and is rotatable about an axis parallel to the optical axis of the light source. The second aperture in the rotatable monitoring assembly may be larger than the first aperture. The second aperture may be formed from two superimposed circular apertures. This larger second aperture allows scattered light to pass from the stack to the detector when the rotatable monitoring assembly is in the zero-check position or the operating position.

When the rotatable monitoring assembly is rotated into the zero-check configuration, light from the light source is blocked by the rotatable monitoring assembly and does not enter the stack. Background light may pass through a second aperture in the rotatable monitoring assembly and may be detected. This light detected when the rotatable monitoring assembly is in the zero-check configuration may be measured to provide a measurement of background light levels.

A stopper may be mounted on the rotatable monitoring assembly. When the rotatable monitoring assembly is in the zero-check configuration, the stopper may be positioned to block light from the light source from passing through the rotatable monitoring assembly.

When the rotatable monitoring assembly is rotated into the span-check configuration, light from the light source passes along the optical path, through the first aperture in the rotatable monitoring assembly and into the stack. The intensity of the light from the light source may be varied, for example, between 100% and 50%. The variation may be periodic. This light is then scattered from particles in the stack. The scattered light passes through the second aperture in the rotatable monitoring assembly. Light of varying intensity may be detected at the detector. The light detected at the detector may vary periodically.

When the rotatable monitoring assembly is rotated into the contamination-check configuration, light from the light source may be reflected through the rotatable monitoring assembly by reflectors, for example mirrors. The rotatable monitoring assembly may block all other light sources from the optical path to the detector. The reflected light from the light source may be attenuated by at least one attenuator before being detected by the detector. The light measured at the detector may then provide a measure of the throughput of the instrument. This measurement may be made during setup of the apparatus and may also be made periodically during operation. By comparing the initial measurement made during set-up to measurements made during operation a correction factor may be obtained which may be used to normalise signals measured at the detector.

At least one attenuator may be used to attenuate light when the rotatable monitoring assembly is in the contamination check position. The attenuators may be positioned in the path of the light, and may reduce the light intensity to prevent saturation of the detector. The attenuators may be diffusers such as opal diffusers, optic attenuators (lenses) or other attenuators. It may be possible to change the attenuators in order to measure different characteristics of the light source.

When the rotatable monitoring assembly is rotated into the safety-shutter configuration, the rotatable monitoring assembly may block particles from reaching optical components in the apparatus by forming a barrier. The rotatable monitoring assembly may automatically rotate into the safety-shutter position in response to a signal.

An air purge may be positioned proximate to the rotatable monitoring assembly, for example on or near the rotatable monitoring assembly. It may be that the air purge is so arranged to cause an airflow (for example of clean air) to pass over the monitoring assembly that separates stack gas from the monitoring assembly. The air purge may be so positioned that it is spaced apart from the rotatable monitoring assembly. The air purge may be arranged to prevent gas and dust particles from the stack from reaching the rotatable monitoring assembly.

An air flow meter may also be positioned proximate to the rotatable monitoring assembly, for example on or near the rotatable monitoring assembly. The air flow meter may be arranged to monitor the flow rate of purge air. The air flow meter may be positioned proximate to the air purge. If the purge air flow rate drops below a specified level during operation, the rotatable monitoring assembly may be configured to automatically rotate into the safety-shutter position.

The apparatus may be installed in the wall of the stack. The particles in the stack may be, for example dust. The dust may be produced by an industrial process.

The light source may be a laser.

The detector may be an imager i.e. a device that provides an image of all light within its field of view. The imager may be a charge-coupled device (CCD). Alternatively, the detector may be a photodiode. Unlike an imager, a photodiode will not provide a spatially resolved image of items within its field of view, but will instead provide only an indication of the total amount of light in the field of view.

The rotatable monitoring assembly may include a third aperture for allowing light to pass from the light source to the stack.

The apparatus may include two light sources, for example two lasers. The light from the first light source may pass through a first aperture in the rotatable monitoring assembly in order to reach the stack, and the second light from the light source may pass through the third aperture in the rotatable monitoring assembly in order to reach the stack.

This may enable two different positions in the stack to be monitored at a given time.

The apparatus may include a beam splitter to split light from the light source along different optical paths. Light from the beam splitter may scatter from multiple different positions in the particle flow simultaneously. Again, this may enable multiple positions in the stack to be monitored at a given time.

The monitoring of the particles flowing in the stack may be, for example, of the density of the particles within the flow, the rate of flow of the particles, and/or the velocity of the particles.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Specific embodiments of the invention will now be described, by way of example only, with particular reference to the accompanying drawings, of which

DETAILED DESCRIPTION

Specific embodiments of the invention will now be described, by way of example only, with particular reference to the accompanying drawings.

Figure 1:
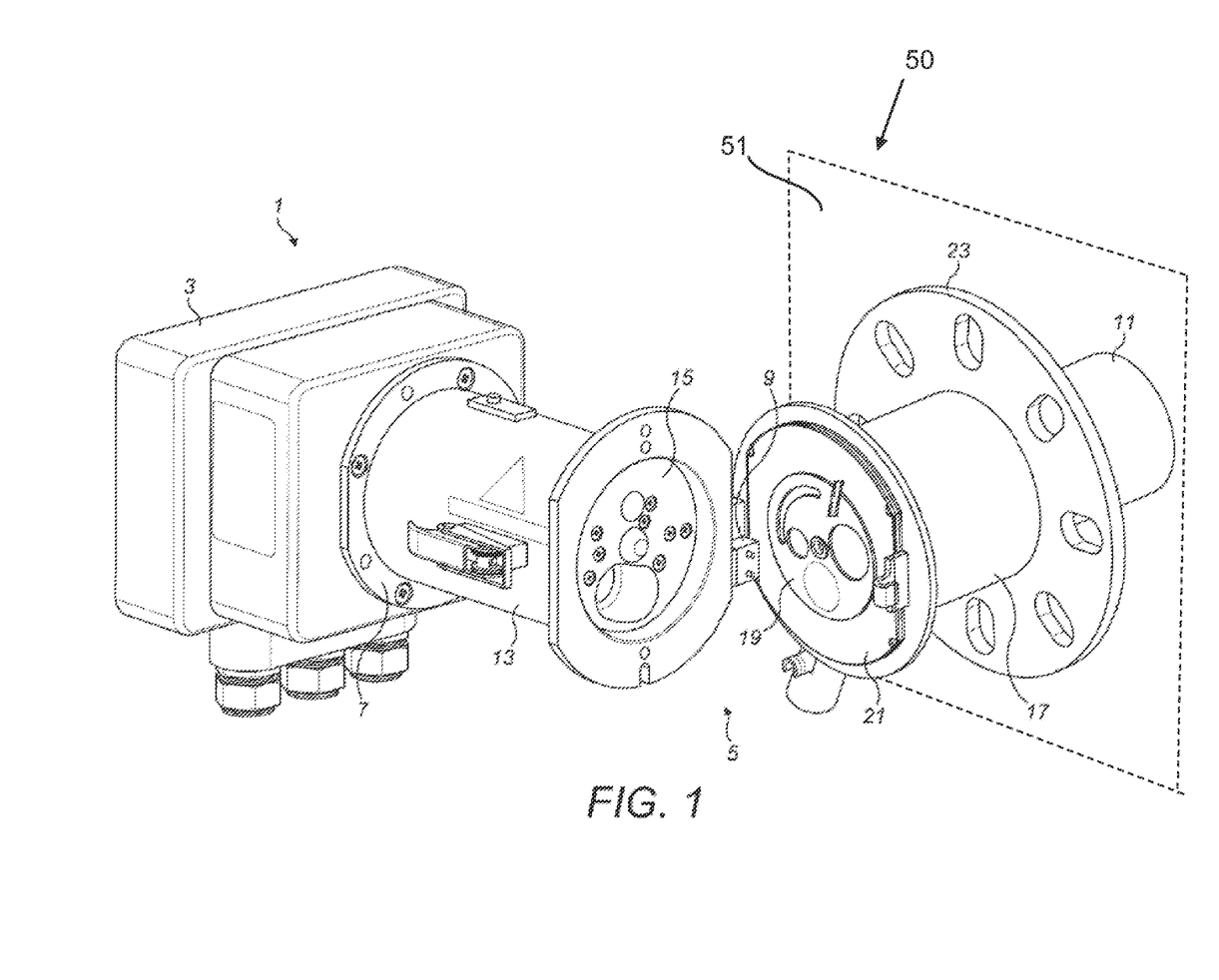
FIG. 1 is a perspective view of the apparatus according to a first example embodiment of the invention.
Figure 1A:
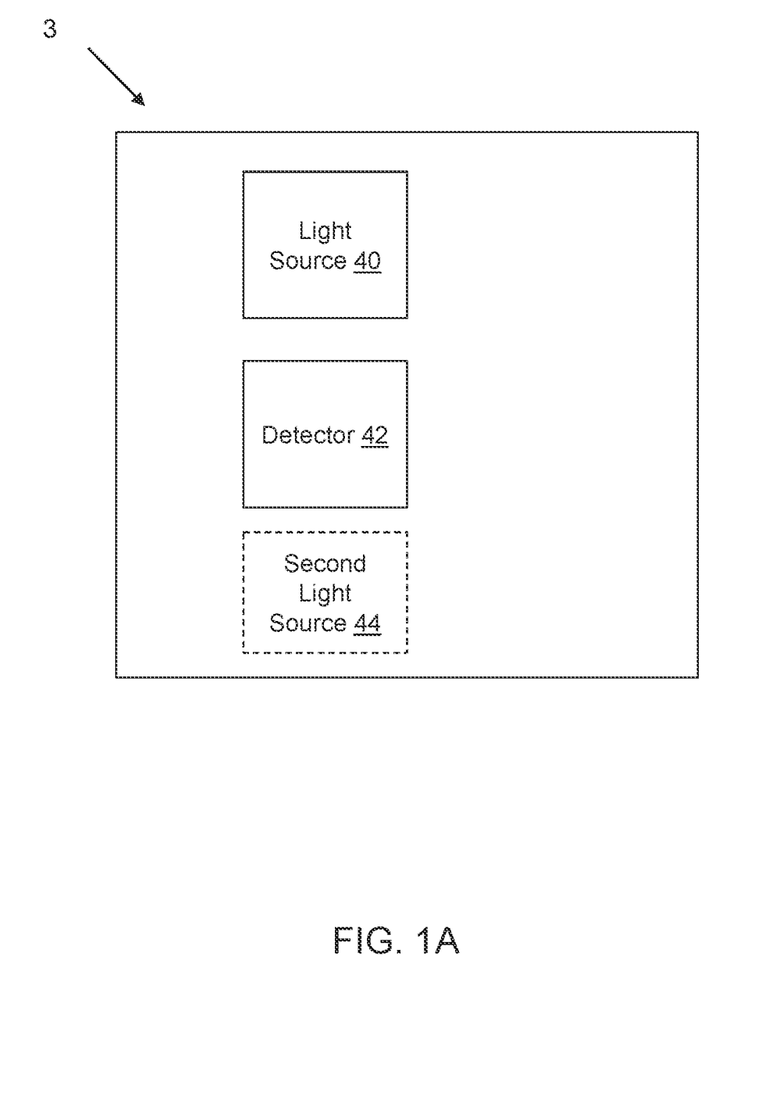
FIG. 1A is a schematic view of the interior of the housing of the apparatus of FIG. 1.

FIGS. 1 and 1A shows apparatus 1 for monitoring particles flowing in a stack according to an example embodiment of the invention. The apparatus includes a housing 3, positioned outside the wall 51 of the stack 50 (a portion of which is indicated schematically in FIG. 1), containing a light source 40 shown in FIG. 1A) and a detector 42 shown in FIG. 1A). The apparatus also includes a two-part tubular casing 5, attached at a first end 7 to the housing 3 and hinged at a mid-point 9 along its length. The casing has been divided into a first proximal part 13 and a second, distal part 17. The second, distal end 11 of the tubular casing 5 sits within the stack. An optical axis runs within the tubular casing 5 from the light source into the stack. The first, proximal part 13 of the casing 5, which is attached to the housing 3 contains a rotatable monitoring assembly 15. The second, distal part 17 of the casing 5 contains a circular cover plate 19 and a gasket 21. The apparatus 1 is mounted to the wall of the stack by a mounting 23 attached to the second part 17 of the casing 5. The mounting 23 can be affixed to the exterior wall of the stack. In some embodiments, a second light source 44 may be present in housing 3.

Figure 2:
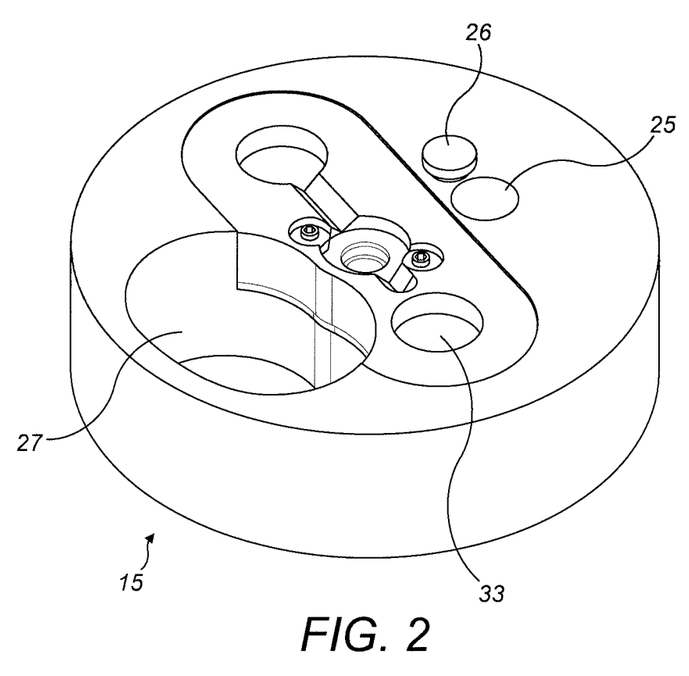
FIG. 2 is a perspective view of the rotatable monitoring assembly.

FIG. 2 shows the rotatable monitoring assembly 15 which is housed within the first, proximal part 13 of the tubular casing 5. The rotatable monitoring assembly includes a first aperture 25 and a second larger aperture 27, the shape of which is formed from two overlapping circles. The rotatable monitoring assembly 15 is rotatable about the optical axis into a plurality of different configurations. In the operation configuration the rotatable monitoring assembly 15 is configured such that light from the light source passes along the optical axis within the housing 5 through the first aperture 25 and into the stack. The light is scattered from particles within the stack 50 (a portion of which is indicated schematically in FIG. 1) and the scattered light passes through the second aperture 27 in the rotatable monitoring assembly 15. The scattered light is then detected by a detector 42 shown in FIG. 1A), positioned within the housing 3.

Figure 4:
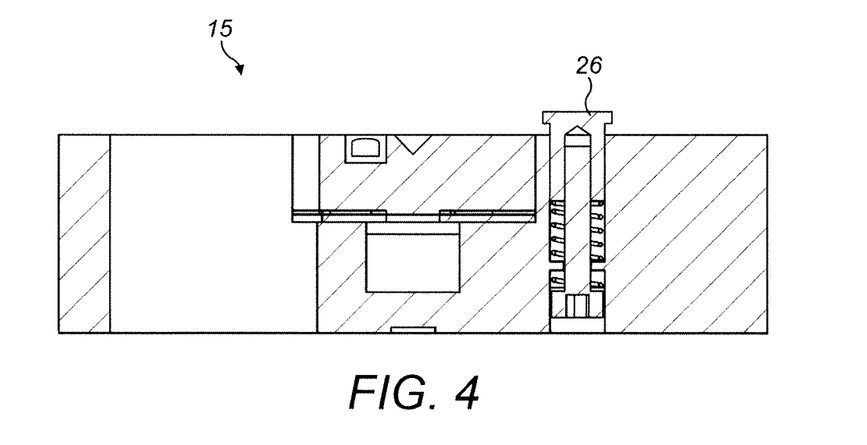
FIG. 4 is an alternative cross-sectional view of the rotatable monitoring assembly showing the stop for use in the zero-check configuration.

In the zero-check configuration, the rotatable monitoring assembly 15 is configured such that light from the light source passes along the optical axis within the housing, but is not incident on an aperture in the rotatable monitoring assembly 15. The light from the light source coincides with a stopper 26 on the rotatable monitoring assembly 15. Light from the light source is therefore blocked and does not enter the stack. Background light arising from the stack environment rather than scattered light from the light source passes through the second aperture 27 and is detected by the detector within the housing 3, providing a zero-check for the apparatus 1. FIG. 4 shows a cross sectional view of the rotatable monitoring assembly 15 showing the stopper 26.

In the span-check configuration, the rotatable monitoring assembly 15 is configured such that light from the light source passes along the optical axis through the first aperture 25 in the rotatable monitoring assembly. As with the operation configuration, the light is scattered from particles in the stack and passes through the second aperture 27 in the rotatable monitoring assembly 15 before being detected by the detector in the housing 3. The intensity of the light from the light source is varied, in this example between 100% and 50%. In this example, the intensity variation is periodic. This leads to a periodically varying scattered intensity being measured at the detector.

Figure 3:
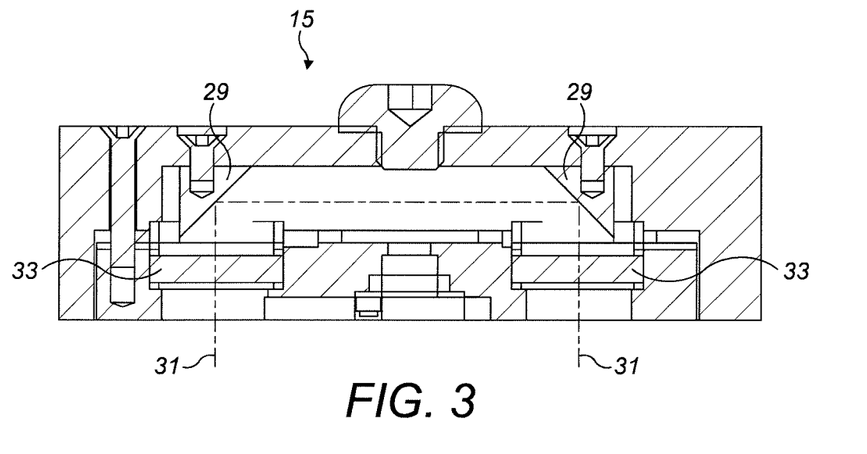
FIG. 3 is a cross-sectional view of the rotatable monitoring assembly.

FIG. 3 shows a cross-sectional view of the rotatable monitoring assembly 15. In the contamination-check configuration, the rotatable monitoring assembly is configured such that light from the light source is reflected by two mirrors 29 along a path 31 through the rotatable monitoring assembly 15 and back to the detector within the housing 3, without entering the stack. The light that has been reflected by the mirrors 29 will be attenuated by attenuators 33 positioned within the rotatable monitoring assembly. In the example embodiment shown here, the attenuators 33 are opal diffusers, but they may be any other attenuators. The attenuators 33 reduce the intensity of the reflected light such that the detector is not saturated. A measurement of reflected light using the contamination check-configuration is made during set-up of the apparatus, and at regular intervals during operation. The measured signals recorded by the detector during operation are compared to the measured signal recorded during the apparatus set-up. The ratio between these signals is used to provide a correction factor, in order to normalise detected measurements made during operation.

Figure 5:
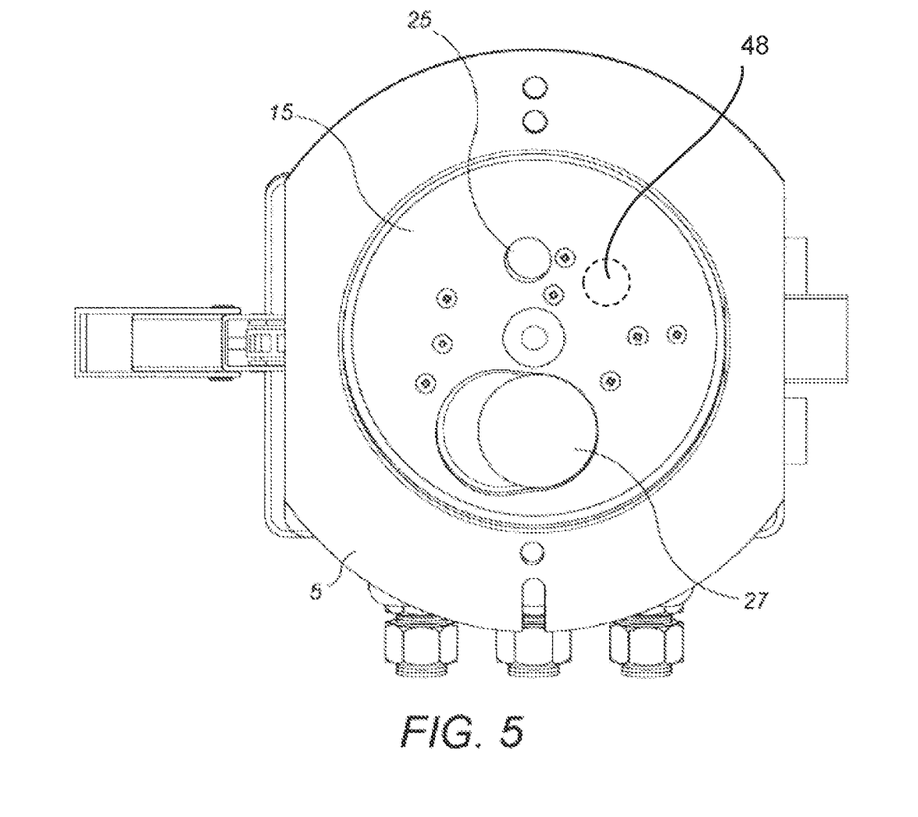
FIG. 5 is a front view of the rotatable monitoring assembly mounted in the casing in the operation configuration.
Figure 6:
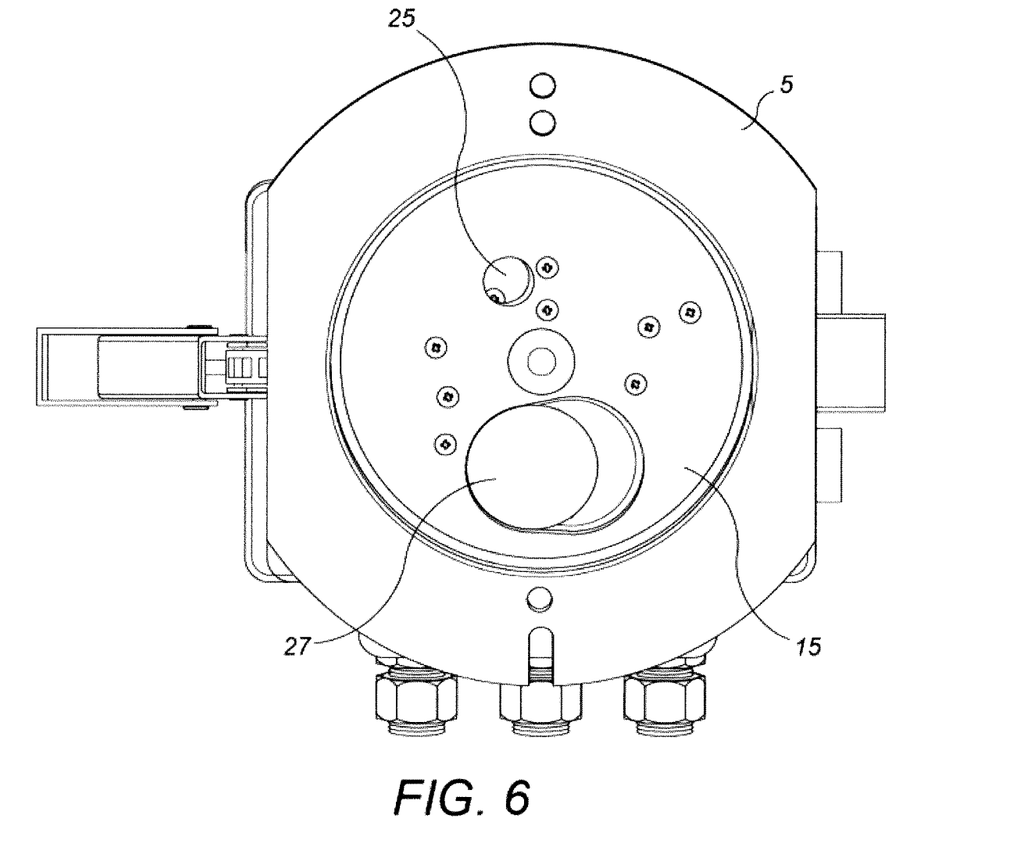
FIG. 6 is a front view of the rotatable monitoring assembly mounted in the casing in the zero-check configuration.
Figure 7:
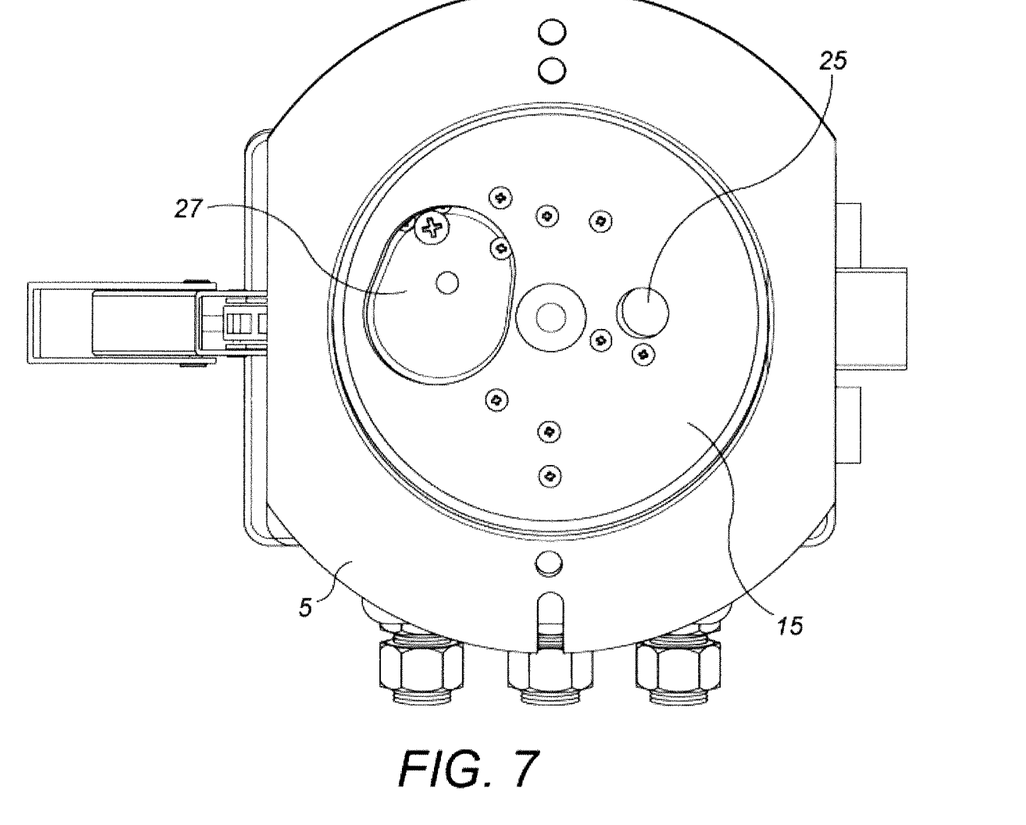
FIG. 7 is a front view of the rotatable monitoring assembly mounted in the casing in the contamination-check, span-check and safety-shutter configurations.

FIGS. 5, 6 and 7 show front views of the rotatable monitoring assembly 15 in the different configurations described above. FIG. 5 shows the rotatable monitoring assembly in the operation configuration. Light from the light source passes along the optical axis through the first aperture 25 and scattered light from the stack passes through the second larger aperture 27 before reaching the detector. A dashed line 48 in FIG. 5 indicates a third aperture that may be present in some embodiments. FIG. 6 shows the rotatable monitoring assembly 15 in the zero-check position. The rotatable monitoring assembly has been rotated about the optical axis such that light from the light source is not incident on the first aperture 25. Background light may pass through the second, larger aperture 27 to the detector, but light from the light source is blocked from reaching the stack by the rotatable monitoring assembly 15. FIG. 7 shows the rotatable monitoring assembly 15 in the contamination check configuration. In this configuration, the rotatable monitoring assembly 15 is rotated about the optical axis such that the light from the light source does not coincide with the first aperture 25, and second aperture 27 does not provide an unimpeded path to the detector. In the contamination-check configuration, the light from the light source is reflected from mirrors onto the detector. The rotatable monitoring assembly is rotated into this position when in the span-check configuration and the safety-shutter configuration.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In some embodiments of the invention, the rotatable monitoring assembly 15 includes a third aperture 48, a second light source 44 and/or a beam splitter to partition light from the light source. In some such embodiments, light passes through the first 25 and third 48 apertures and is scattered from different positions in the stack simultaneously.

The invention claimed is:

1. A method of monitoring particles flowing in a stack, the method comprising:
   emitting light from a light source along an optical path for scattering from the particles;
   rotating a rotatable monitoring assembly mounted in the optical path; and
   detecting the scattered light using a detector;
   wherein the rotatable monitoring assembly contains at least two apertures and the method further comprises rotating the rotatable monitoring assembly into a plurality of different configurations, including:
   an operation configuration, wherein the light passes through the rotatable monitoring assembly and into the stack unimpeded;

a zero-check configuration, wherein the rotatable monitoring assembly blocks the light from reaching the stack;
a span-check configuration, wherein light of varying intensity passes from the light source through the rotatable monitoring assembly into the stack;
a contamination-check configuration, wherein the light is reflected through the rotatable monitoring assembly onto the detector, without entering the stack; and
a safety-shutter configuration, wherein the rotatable monitoring assembly protects the detector from particles in the stack,
wherein the rotatable monitoring assembly is positioned along an optical axis of the light source, and is rotatable about an axis parallel to the optical axis of the light source.

2. The method of claim wherein the monitoring of the particles flowing in the stack is of a density of the particles within a flow, a rate of flow of the particles, and/or a velocity of the particles.

3. Apparatus for monitoring particles flowing in a stack, the apparatus comprising:
a light source for emitting light along an optical path for scattering from the particles;
a rotatable monitoring assembly mounted in the optical path;
a detector for detecting the scattered light;
wherein the rotatable monitoring assembly contains at least two apertures and is configurable into a plurality of different configurations, including:
an operation configuration, wherein the light passes through the rotatable monitoring assembly and into the stack unimpeded;
a zero-check configuration, wherein the rotatable monitoring assembly blocks the light from reaching the stack;
a span-check configuration, wherein light of varying intensity passes from the light source through the rotatable monitoring assembly into the stack;
a contamination-check configuration, wherein the light is reflected through the rotatable monitoring assembly onto the detector, without entering the stack; and
a safety-shutter configuration, wherein the rotatable monitoring assembly protects the detector from the particles in the stack,
wherein the rotatable monitoring assembly is positioned along an optical axis of the light source, and is rotatable about an axis parallel to the optical axis of the light source.

4. The apparatus of claim 3, wherein the at least two apertures include a first aperture and a second aperture, wherein the second aperture in the rotatable monitoring assembly is larger than the first aperture, and wherein the second aperture is formed from two superimposed circular apertures.

5. The apparatus of claim 3, wherein a stopper is mounted on the rotatable monitoring assembly, such that when the rotatable monitoring assembly is in the zero-check configuration, the stopper is positioned to block light from the light source from passing through the rotatable monitoring assembly.

6. The apparatus of claim 3, wherein at least one attenuator is used to attenuate light when the rotatable monitoring assembly is in the contamination-check configuration.

7. The apparatus of claim 6, wherein the at least one attenuator is interchangeable in order to measure different characteristics of the light source.

8. The apparatus of claim 3, wherein an air purge is positioned proximate to the rotatable monitoring assembly and is so arranged to cause an airflow to pass over the rotatable monitoring assembly that separates stack gas from the rotatable monitoring assembly.

9. The apparatus of claim 8, wherein an air flow meter is positioned proximate to the rotatable monitoring assembly and is arranged to monitor a flow rate of purge air.

10. The apparatus of claim 3, wherein the apparatus is configured to be installed in a wall of the stack.

11. The apparatus of claim 3, wherein the light source is a laser.

12. The apparatus of claim 3, wherein the detector is an imager.

13. The apparatus of claim 3, wherein the rotatable monitoring assembly includes a third aperture for allowing light to pass from the light source to the stack.

14. The apparatus of claim 3, further comprising a second light source.

15. An apparatus for monitoring particles flowing in a stack, the apparatus comprising:
a light source for emitting light along an optical path for scattering from the particles;
a rotatable monitoring assembly mounted in the optical path;
a detector for detecting the scattered light;
wherein the rotatable monitoring assembly contains at least two apertures and is configurable into a plurality of different configurations, including:
an operation configuration, wherein the light passes through the rotatable monitoring assembly and into the stack unimpeded;
a zero-check configuration, wherein the rotatable monitoring assembly blocks the light from reaching the stack;
a span-check configuration, wherein light of varying intensity passes from the light source through the rotatable monitoring assembly into the stack;
a contamination-check configuration, wherein the light is reflected through the rotatable monitoring assembly onto the detector, without entering the stack; and
a safety-shutter configuration, wherein the rotatable monitoring assembly protects the detector from the particles in the stack, wherein the rotatable monitoring assembly includes a third aperture for allowing light to pass from the light source to the stack.

* * * * *